United States Patent
Kashiwagi et al.

(10) Patent No.: US 11,934,697 B2
(45) Date of Patent: Mar. 19, 2024

(54) INFORMATION PROCESSING APPARATUS, METHOD, AND PROGRAM

(71) Applicant: NIPPON TELEGRAPH AND TELEPHONE CORPORATION, Tokyo (JP)

(72) Inventors: Keiichiro Kashiwagi, Musashino (JP); Hisaharu Ishii, Musashino (JP); Yui Saito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 335 days.

(21) Appl. No.: 17/426,710

(22) PCT Filed: Jan. 10, 2020

(86) PCT No.: PCT/JP2020/000673
§ 371 (c)(1),
(2) Date: Jul. 29, 2021

(87) PCT Pub. No.: WO2020/158347
PCT Pub. Date: Aug. 6, 2020

(65) Prior Publication Data
US 2022/0100426 A1     Mar. 31, 2022

(30) Foreign Application Priority Data

Jan. 30, 2019   (JP) ................................ 2019-014248

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0673* (2013.01); *G06F 12/10* (2013.01)

(58) Field of Classification Search
CPC ...... G06F 12/10; G06F 3/0604; G06F 3/0659; G06F 3/0673; G06F 8/441; G06F 8/4434; G06F 8/4441; G06F 9/4493
See application file for complete search history.

(56) References Cited

U.S. PATENT DOCUMENTS

2007/0299863 A1   12/2007   Fu et al.

OTHER PUBLICATIONS

"Introducing JSON" URL:https://www.json.org/json-ja.html; Jun. 1, 2010.

(Continued)

*Primary Examiner* — Yong J Choe
(74) *Attorney, Agent, or Firm* — Harness, Dickey & Pierce, P.L.C.

(57) ABSTRACT

An information processing apparatus according to an embodiment includes: a creation processing unit which creates information indicating a message structure based on which a length of a memory area to be secured in a stack area of a virtual address space assigned for a serialization process is determined during compilation; a serialization processing unit which performs a serialization process to serialize data from a device and write the serialized data into a data storage device using the information created by the creation processing unit; and a deserialization processing unit which reads the serialized data written into the data storage device and deserializes the read data using the information created by the creation processing unit.

6 Claims, 13 Drawing Sheets

(56) References Cited

OTHER PUBLICATIONS

Bray, Tim, et al., "Extensible Markup Language (XML)", World Wide Web Journal 2.4 (1997): 27-66.
"MessagePack: It's like JSON. but fast and small", Internet <URL : https://msgpack.org/>; Jun. 14, 2012.
"Protocol Buffers", Internet URL:https://developers.google.com/protocol-buffers/; May 26, 2017.
Vanura, Jan, and Pavel Kriz, "Performance Evaluation of Java (registered trademark), JavaScript (registered trademark) and PHP Serialization Libraries for XML, JSON and Binary Formats" International Conference on Services Computing. Springer, Cham, 2018.
International Search Repot issued in PCT/JP2020/000673, dated Mar. 31, 2020.

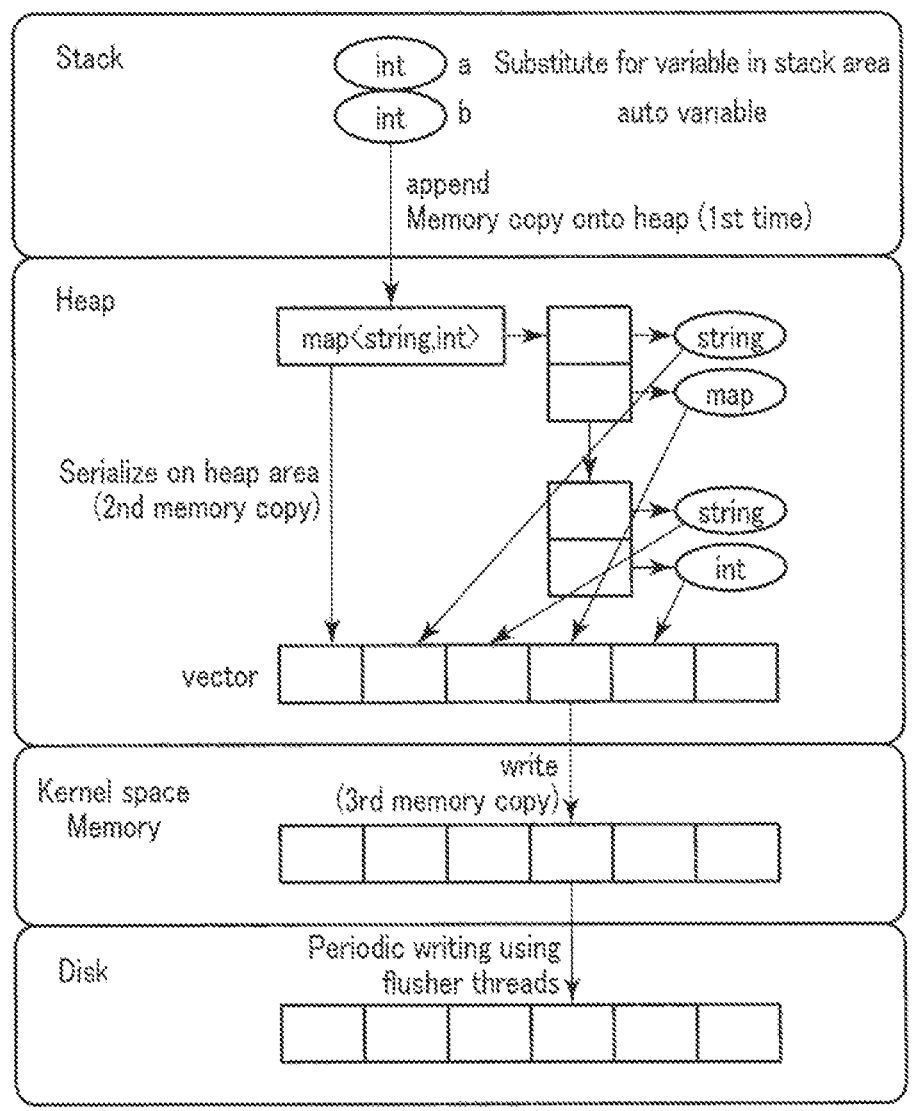
F I G. 8

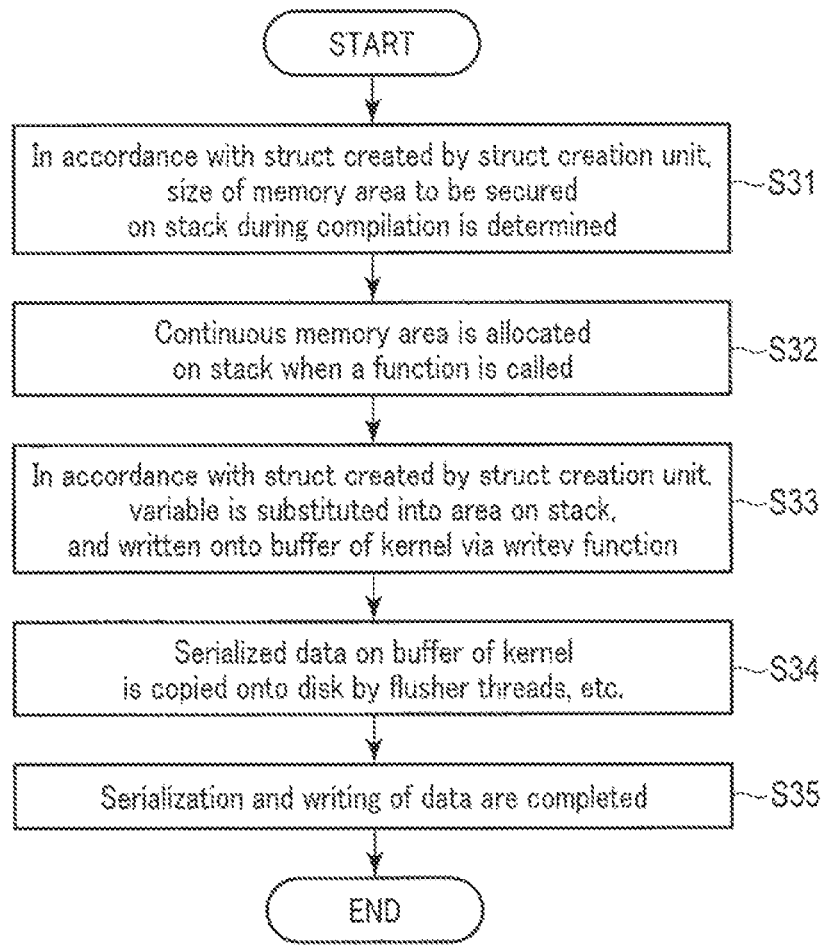
F I G. 10

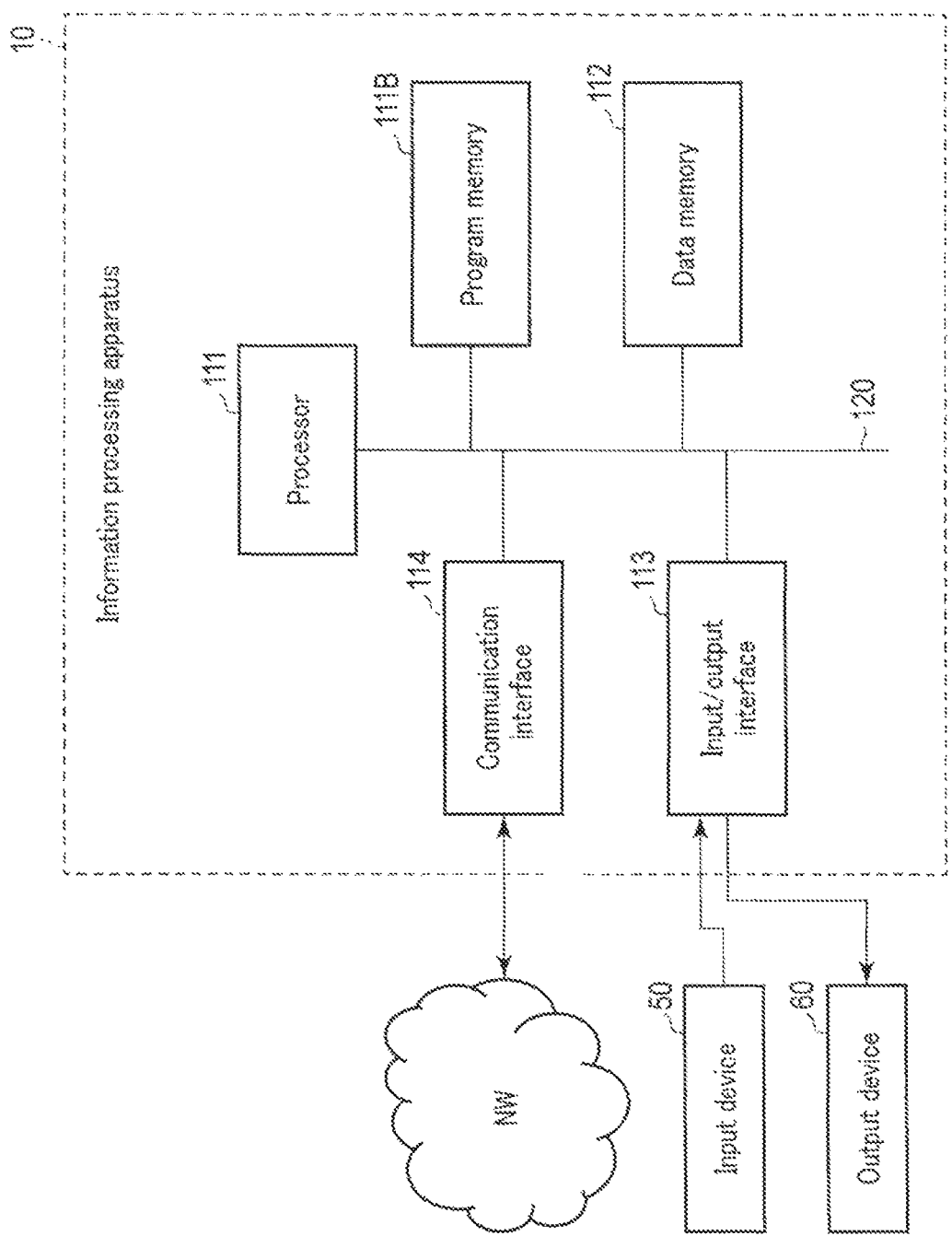
F I G. 16

INFORMATION PROCESSING APPARATUS, METHOD, AND PROGRAM

CROSS-REFERENCE TO RELATED APPLICATIONS

This application is a 371 U.S. National Phase of International Application No. PCT/JP2020/000673 filed on Jan. 10, 2020, which claims priority to Japanese Application No. 2019-014248 filed on Jan. 30, 2019. The entire disclosures of the above applications are incorporated herein by reference.

FIELD

An embodiment of the present invention relates to an information processing apparatus, an information processing method, and an information processing program.

BACKGROUND

In an Internet of Things (IoT) system, there is a case where data created by a device is serialized and transmitted, written into a database via a broker and middleware, and then deserialized when the written data is read.

Generally known serialization or deserialization formats (hereinafter referred to as "serialization formats") are classified into the following first and second formats.

The first format is a text-based serialization format, and examples include JSON (see, for example, Non-Patent Document 1) and Extensible Markup Language (XML) (see, for example, Non-Patent Document 2).

The text-based serialization format has the advantage of high readability. On the other hand, the disadvantages include: (1) a large data size; and (2) a delay in the serialization or deserialization process caused by the need to perform an escape process on some symbols when such symbols are used or when the data is an embedded type.

The second format is a binary-based serialization format, and examples include MessagePack (see, for example, Non-Patent Document 3) and Protocol Buffers (see, for example, Non-Patent Document 4). An advantage of the binary-based serialization format is the high speed of the serialization or deserialization process, since the data is small in size and binary data is handled as it is (see, for example, Non-Patent Document 5).

The disadvantage of the binary-based serialization format is low readability; however, the following matters (1) to (3) can be said.

(1) In an IoT system, the data to be treated is, in most cases, integer value data such as sensor data, in which the number of character strings is small.

(2) In communications between devices, etc. in an IoT system, readability is not given importance, since data is read by humans only occasionally.

(3) In an IoT system, an apparatus that aggregates data of devices is often constrained in terms of calculation and memory resources.

For the above reasons, a binary serialization format, which is a format with a lower load, is suitable for the serialization or deserialization process.

CITATION LIST Non-Patent Literature

Non-Patent Document 1: "Introducing JSON" <URL: https://www.json.org/json-ja.html>

Non-Patent Document 2: Bray, Tim, et al., "Extensible Markup Language (XML)", World Wide Web Journal 2.4 (1997): 27-66.

Non-Patent Document 3: "MessagePack: It's like JSON. but fast and small", Internet <URL : https://msgpack.org/>

Non-Patent Document 4: "Protocol Buffers", Internet <URL: https://developers.google.com/protocol-buffers/>

Non-Patent Document 5: Vanura, Jan, and Pavel Kriz, "Performance Evaluation of Java (registered trademark), JavaScript (registered trademark) and PHP Serialization Libraries for XML, JSON and Binary Formats" International Conference on Services Computing. Springer, Cham, 2018.

SUMMARY

Technical Problem

In recent years, attention has been focused on an IoT system in which processing is performed by an edge device (edge) disposed near a device that creates data.

In comparison with a cloud service in which plenty of aggregated resources can be utilized, gateway devices used as edges that are distributed across various points need to be inexpensive, and data from a large number of devices is aggregated into each gateway device. It is thus difficult to increase the number of devices to be accommodated, unless processing is performed at a higher speed than processing using the conventional binary serialization format.

In IoT data processing in which a large number of items of data are targets for the processing, there has been a demand for a serialization format that is capable of performing serialization and deserialization processes at a higher speed with a smaller memory capacity.

The present invention has been made in view of the above circumstances, and its objective is to provide a technique capable of performing data serialization and deserialization processes at high speed with a small memory capacity.

Solution to Problem

In order to achieve the object, an aspect of the present invention is that an information processing apparatus includes: a creation processing unit which creates information indicating a message structure based on which a length of a memory area to be secured in a stack area of a virtual address space assigned for a serialization process is determined during compilation; a serialization processing unit which performs a serialization process to serialize data from a device and write the serialized data into a data storage device using the information created by the creation processing unit; and a deserialization processing unit which reads the serialized data written into the data storage device and deserializes the read data using the information created by the creation processing unit.

An aspect of the present invention is that an information processing method performed by an information processing apparatus including a data storage apparatus, includes: creating information indicating a message structure based on which a length of a memory area to be secured in a stack area of a virtual address space assigned for a serialization process is determined during compilation; serializing data from a device and writing the serialized data into the data storage device using the created information; and reading the serialized data written into the data storage device and deserializing the read data using the created information.

Advantageous Effects of Invention

According to the present invention, it is possible to perform data serialization deserialization processes at high speed with a small memory capacity.

BRIEF DESCRIPTION OF THE DRAWINGS

FIG. 8 is a diagram illustrating a procedure of data writing and serialization processes when a general serialization format is applied.

FIG. 10 is a flowchart showing an example of a procedure of data writing and serialization processes by the information processing apparatus according to the embodiment of the present invention.

FIG. 16 is a block diagram showing an example of a hardware configuration of the information processing apparatus according to the embodiment of the present invention.

DETAILED DESCRIPTION

Figure 1:
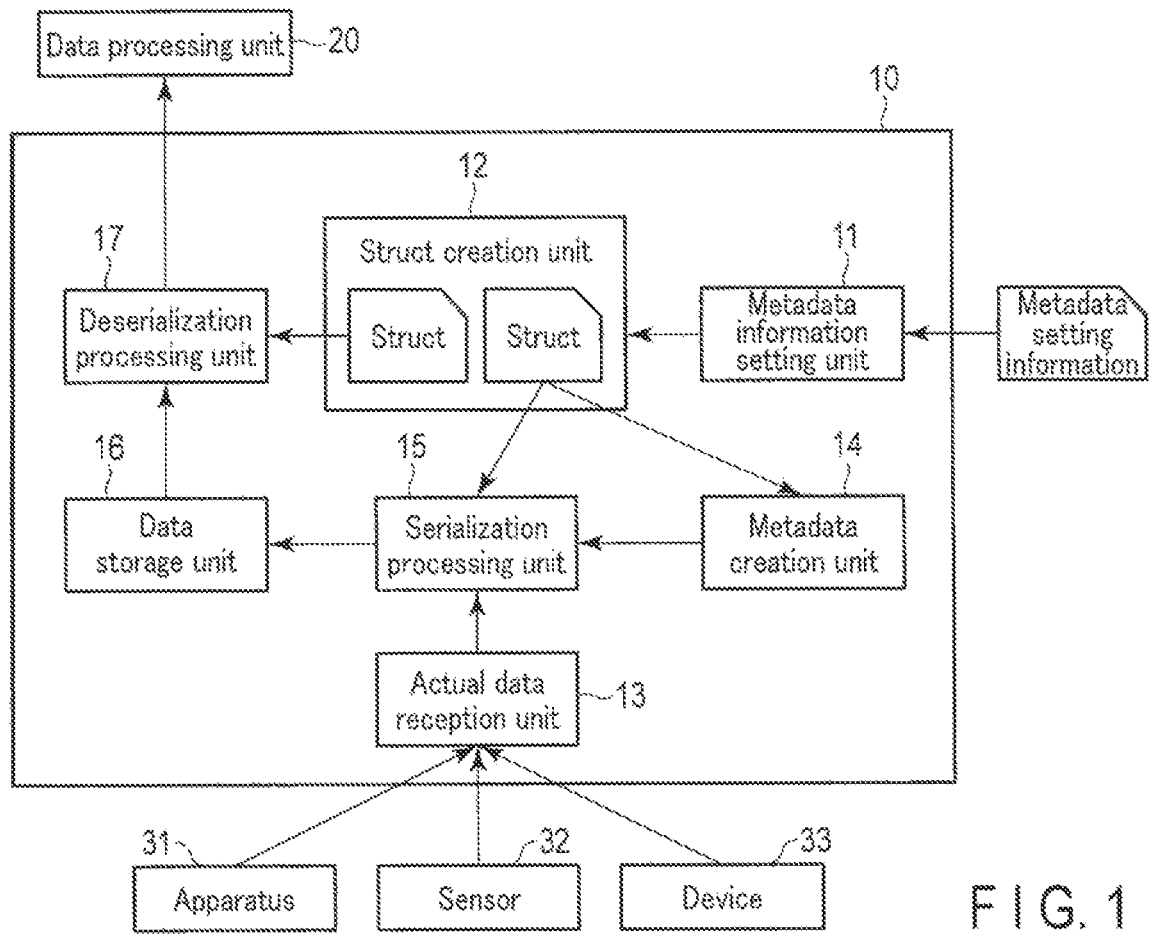
FIG. 1 is a diagram showing an application example of an information processing apparatus according to an embodiment of the present invention.

Hereinafter, embodiments according to the present invention will be described with reference to the drawings.

In the conventional binary serialization format, the data size is not determined during compilation. The data size refers to, for example, a size (length) of a memory area secured in a stack area of a user space in a virtual address space when data is written into a disk which is a memory area (also simply referred to as a "memory") of a physical address space. Therefore, every time data is written, it is necessary to secure a memory necessary for a heap in the user space, and it takes time to perform memory allocation, which is a process of securing the necessary memory.

In an embodiment of the present invention, utpack, which is a high-speed serialization or deserialization method compatible with MessagePack and which has the following features, will be described.

The features of utpack include at least the following (1) to (5).

(1) There is common prior knowledge (a struct) in data serialization and deserialization processes. The struct refers to a structure of a message defined by the number of items of metadata, the data type, the order (relative address), etc. For the struct, information on a relative address with respect to each variable is created from a data size and a head address of data during compilation.

(2) Since the struct is used for serialization, the serialization is directly performed in a memory area on a stack during data writing, thus allowing the serialization to be performed at high speed.

The struct being used for serialization means that the struct is defined in advance so as to conform to the specification of the message format, and substitution of a value for a variable of a stack area secured as the struct means that serialization is performed. Since the struct is defined in advance so as to conform to the specification of the message format, the struct is defined using the data type to be described later.

(3) Since the struct is used for deserialization, memory allocation during data reading and data copying between a kernel space and a user space are eliminated, thus allowing the deserialization to be performed at high speed. The use of the struct for deserialization means that deserialization is performed, using the struct, by reinterpreting the address by dynamic casting of a pointer of a relative address representing a variable defined by the struct.

Herein, the head address of the mapped area is set to a pointer of a relative address representing a variable based on the struct, and the dynamic casting of the pointer causes the address to be reinterpreted between the kernel space and the user space, thereby performing data deserialization.

(4) Since the format is compatible with MessagePack, the deserialization can be performed even without a struct.

(5) A source code that defines a struct and a source code for performing a serialization or deserialization process based on this definition are created by metaprogramming. This eliminates the necessity for the programmer to modify the source code of the serialization or deserialization process every time the definition of the struct is changed.

In utpack, a struct is defined using a variable of a fixed length in such a manner that the data size is determined during compilation, and information on the struct can be shared between the serialization and deserialization processes. Moreover, by defining the message format corresponding to the struct, a continuous memory area is secured on the stack, thus reducing the memory allocation time.

In other words, utpack is a method of performing a serialization or deserialization process at high speed with a small memory capacity, through improvement in the definition of the struct and the utilization of the memory.

FIG. 1 is a diagram showing an application example of an information processing apparatus according to an embodiment of the present invention. This information processing apparatus is an apparatus for realizing the utpack system.

As shown in FIG. 1, the information processing apparatus 10 includes a metadata information setting unit 11, a struct creation unit 12, an actual data reception unit 13, a metadata creation unit 14, a serialization processing unit 15, a data storage unit 16, and a deserialization processing unit 17. Functions of the information processing apparatus 10 shown in FIG. 1 are implemented by using a processor such as a central processing unit (CPU) that executes a program, an input device such as a keyboard, an output device such as a display, and a storage medium such as a random access memory (RAM) or a read-only memory (ROM). The data storage unit 16 is, for example, a single-thread embedded database. An operation of each component will be described later.

Figure 2:
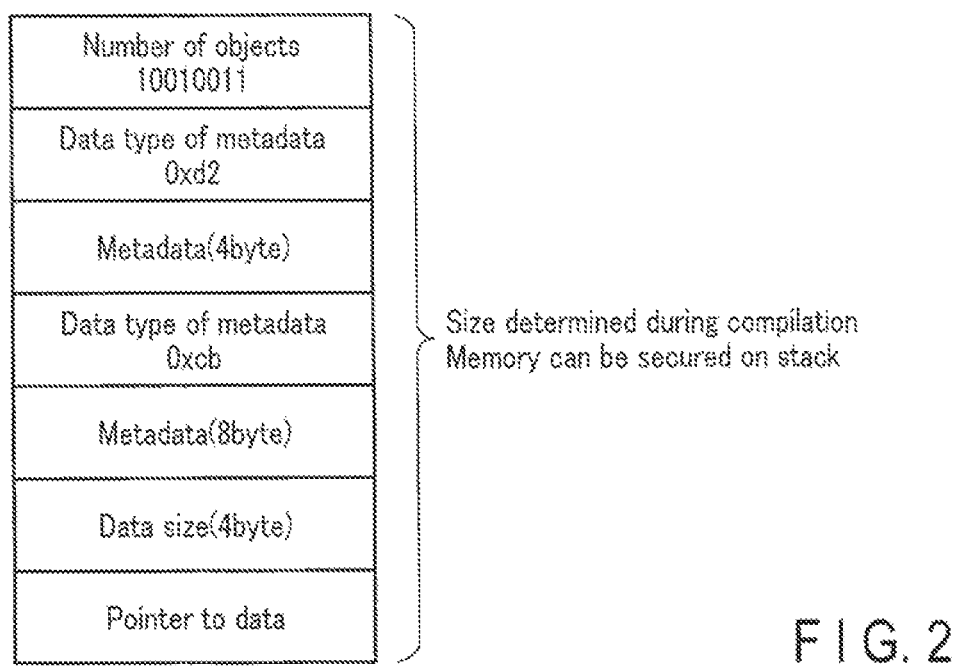
FIG. 2 is a diagram showing an example of a struct applied to the information processing apparatus according to the embodiment of the present invention.

FIG. 2 is a diagram showing an example of a struct applied to the information processing apparatus according to the embodiment of the present invention.

The example shown in FIG. 2 is an example of a struct when utpack is applied, which includes the number of objects, the data type of metadata, metadata, the data size, and a pointer to data to be a target of access. In the struct, the type, number and order of variables are defined. By the struct, the size of a memory area required for data writing during compilation is determined, allowing the memory area to be secured on the stack. In the example shown in FIG. 2, let us assume that an example of a struct is a variable template class.

Figure 3:
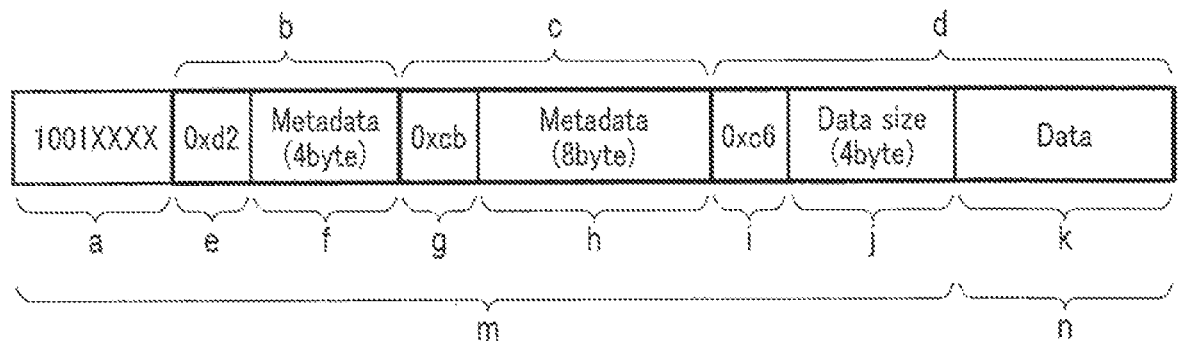
FIG. 3 is a diagram showing an example of a message format applied to the information processing apparatus according to the embodiment of the present invention.

FIG. 3 is a diagram showing an example of a message format applied to the information processing apparatus according to the embodiment of the present invention.

The example shown in FIG. 3 is an example of a message format when utpack is applied. The message format when utpack is applied is defined as being compatible with MessagePack. Therefore, data can be converted even when the serialization and deserialization processes do not share the struct information.

In the example shown in FIG. 3, the message format includes the number of objects (variable) ("a" in FIG. 3) included in a single message, an object a (metadata a) in a given data type ("b" in FIG. 3), an object b (metadata b) in a given data type ("c" in FIG. 3), and a last object ("d" in FIG. 3).

The object a in a given data type includes a given data type ("e" in FIG. 3) and metadata ("f" in FIG. 3). The object b in a given data type includes a given data type ("g" in FIG. 3) and metadata ("h" in FIG. 3). The last object contains a datatype (bin32) ("i" in FIG. 3), the length of the actual data ("j" in FIG. 3), and the actual data ("k" in FIG. 3).

The data type shown in FIG. 3 is fixarray (an array whose length is up to 15 elements) (zero to 14 metadata objects +last object).

The "a" and "e" to "j" in FIG. 3 correspond to a header (a portion other than the actual data) ("m" in FIG. 3), and "k" in FIG. 3 corresponds to a body (actual data) ("n" in FIG. 3).

Figure 4:
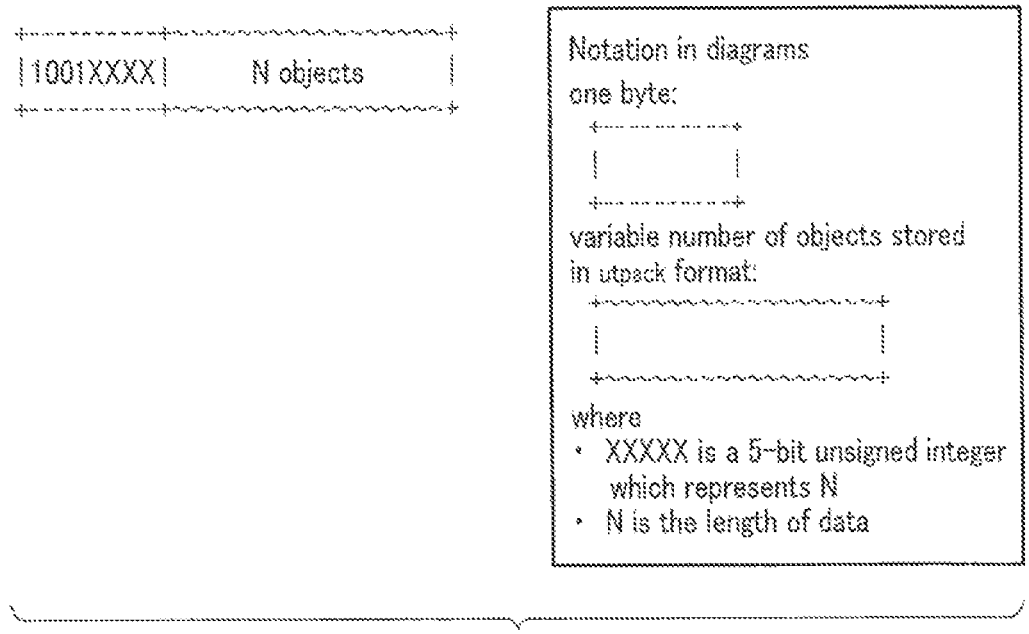
FIG. 4 is a diagram showing an example of a header definition of a message format applied to the information processing apparatus according to the embodiment of the present invention.

FIG. 4 is a diagram illustrating an example of a header definition of a message format applied to the information processing apparatus according to the embodiment of the present invention. FIG. 4 shows an example of a header definition when utpack is applied.

Figure 5:
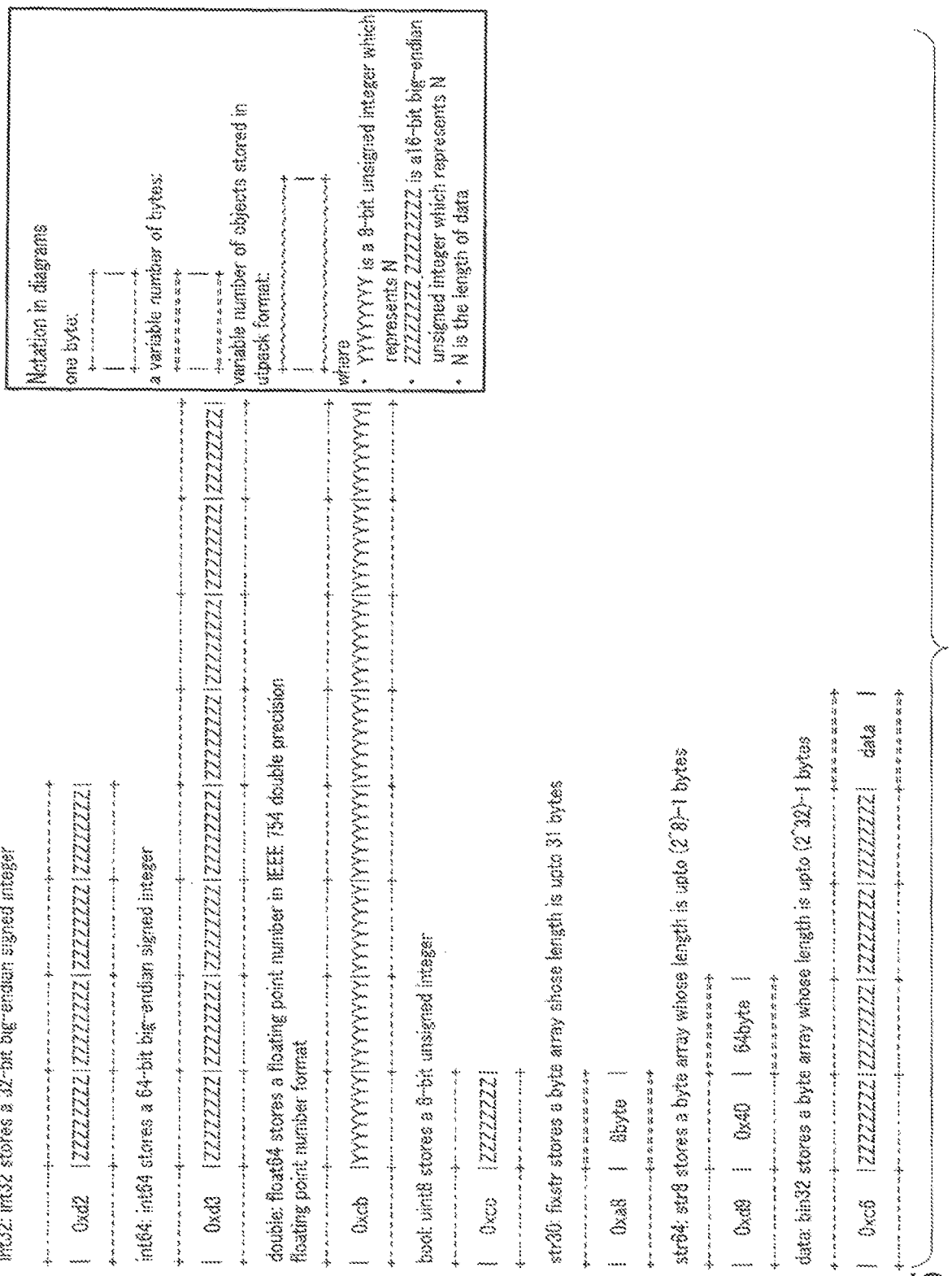
FIG. 5 is a diagram showing an example of a data type definition of a message format applied to the information processing apparatus according to the embodiment of the present invention.

FIG. 5 is a diagram showing an example of a data type definition of a message format applied to the information processing apparatus according to the embodiment of the present invention. FIG. 5 shows an example of a data type definition compatible with utpack.

Figure 6:
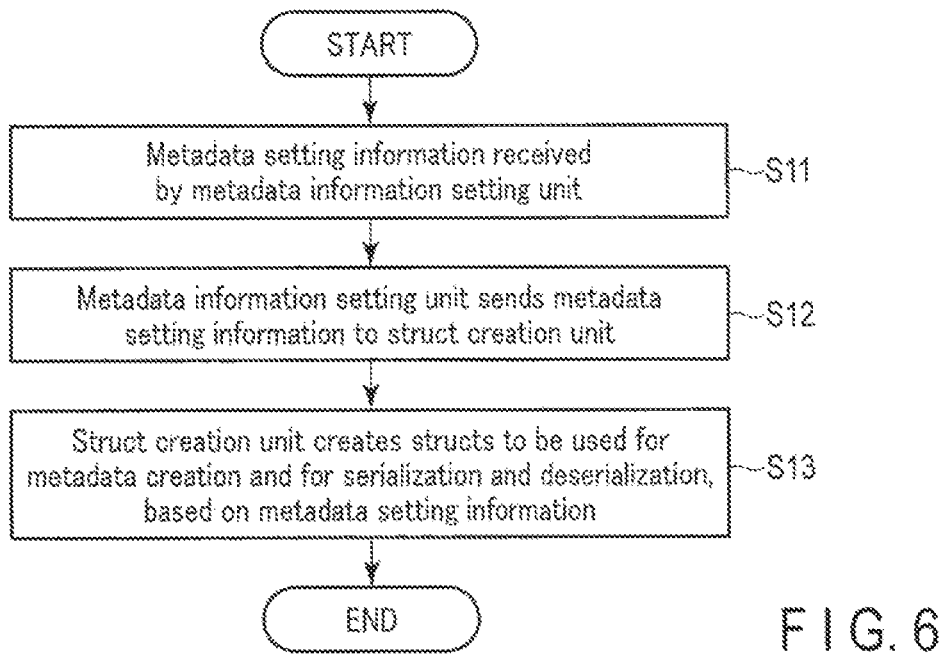
FIG. 6 is a flowchart showing an example of a procedure of struct creation by the information processing apparatus according to the embodiment of the present invention.

FIG. 6 is a flow chart showing an example of a procedure of struct creation by the information processing apparatus according to the embodiment of the present invention.

First, the metadata information setting unit 11 receives metadata setting information (S11).

The metadata information setting unit 11 sends metadata setting information to the struct creation unit 12 (S12).

Based on the metadata setting information, the struct creation unit 12 creates, as a creation processing unit, structs to be respectively used for metadata creation and serialization and deserialization (S13).

Figure 7:
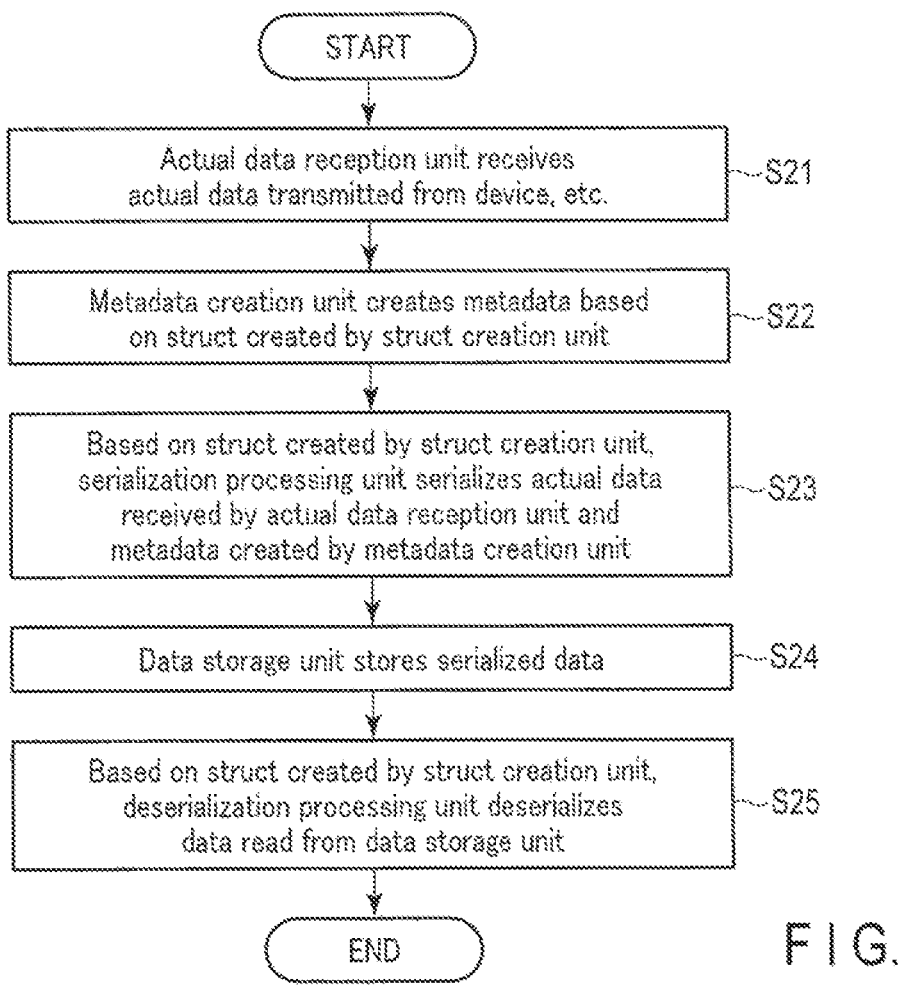
FIG. 7 is a flowchart showing an example of a procedure of data processing by the information processing apparatus according to the embodiment of the present invention.

FIG. 7 is a flowchart showing an example of a procedure of data processing by the information processing apparatus according to the embodiment of the present invention.

After the struct is created as described above, the actual data reception unit 13 receives actual data transmitted from the apparatus 31, the sensor 32, the device 33, etc. provided outside the information processing apparatus 10 (S21).

The metadata creation unit 14 creates metadata based on the struct created by the struct creation unit 12 (S22).

Based on the struct created by the struct creation unit 12, the serialization processing unit 15 serializes the actual data received by the actual data reception unit 13 and the metadata created by the metadata creation unit 14 (S23).

The data storage unit 16 stores the serialized data as a data accumulation apparatus (S24).

Based on the struct created by the struct creation unit 12, the deserialization processing unit 17 performs a deserialization process on the data read from the data storage unit 16 and passes the processed data to the data processing unit 20 provided outside the information processing apparatus 10 (S25).

Next, the data writing and serialization processes will be described.

FIG. 8 is a diagram showing an example of a procedure of data writing when a general serialization format is applied. The procedure of this data writing is expressed by the following (1) to (7).

(1) First, upon execution, the serialization processing unit 15 allocates a memory of a required size to a heap area via a malloc function.

(2) The serialization processing unit 15 substitutes a value for a variable on a stack area.

(3) The serialization processing unit 15 creates a map structure composed of Key and Value on the heap via a mmap function or the like. An example in which the mmap function is used is an example when a C++ library such as a header-only library including information on a struct is used. If the message format is MessagePack, a defined structure such as Array is created.

(4) The serialization processing unit 15 assigns the variable on the stack to the map on the heap via an append function or the like. Through (4), a first memory copy is performed.

(5) The serialization processing unit 15 copies the assigned structured data on the heap via a function such as Serialize, arranges and serializes the data as a vector in a continuous memory area on the heap. Through (5), a second memory copy is performed.

(6) The serialization processing unit 15 copies data serialized as a vector on the heap to a buffer of a memory of a kernel space in a virtual address space via a write function or the like. Through (6), a third memory copy is performed.

(7) The serialization processing unit 15 copies the serialized data, which has been copied onto the buffer of the memory in the kernel space, onto a disk by periodic writing or the like using a flusher thread.

The advantages of (1) to (7) include a dynamic change of the Key and Value structures during execution, as a result of creation of a map structure and a vector on the heap. However, a plurality of memory copies occur in the course of serialization.

Figure 9:
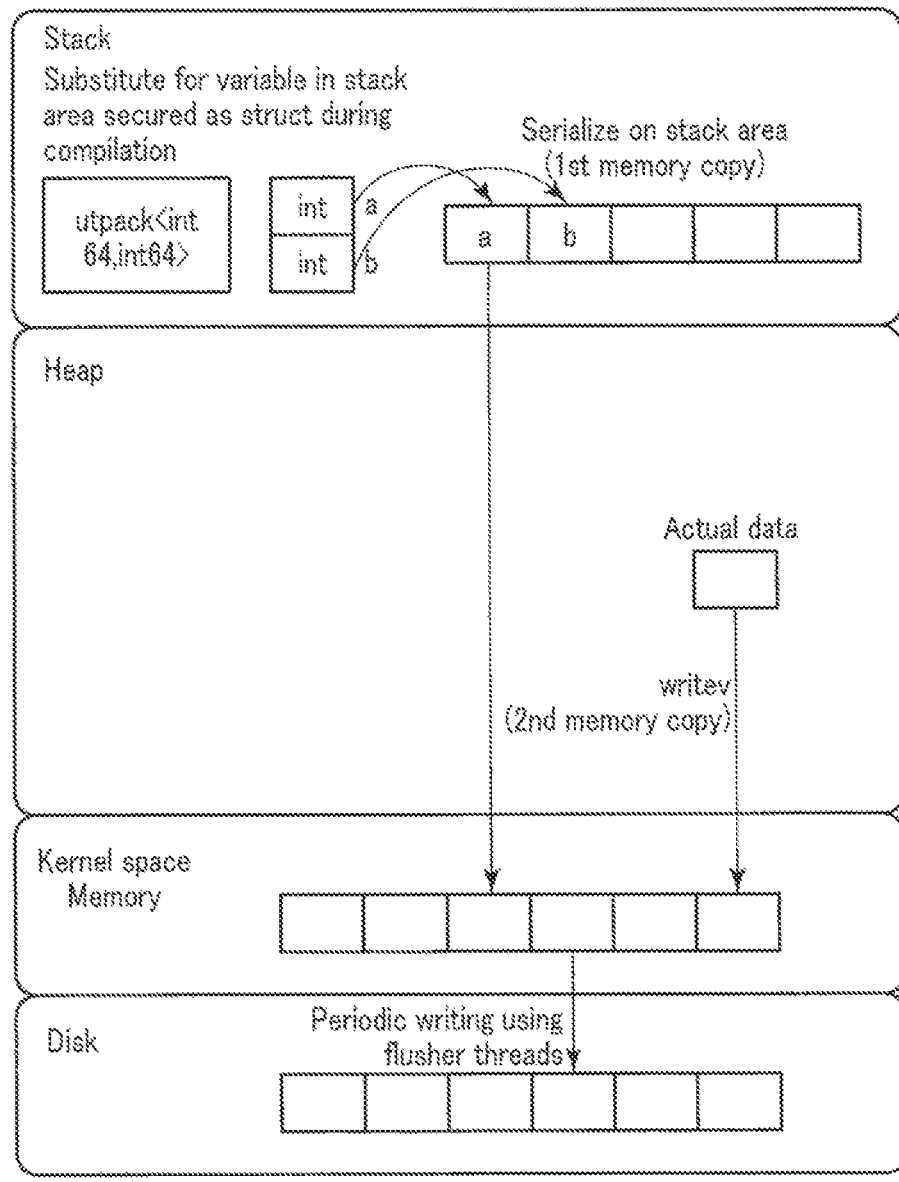
FIG. 9 is a diagram illustrating an example of a procedure of data writing and serialization processes by the information processing apparatus according to the embodiment of the present invention.

FIG. 9 is a diagram illustrating an example of a procedure of data writing and serialization processes by the information processing apparatus according to the embodiment of the present invention. FIG. 10 is a flowchart showing an example of a procedure of data writing and serialization processes by the information processing apparatus according to the embodiment of the present invention.

This procedure is a procedure for data writing and serialization processes when utpack is applied, and is expressed as in the following (1) to (5).

(1) In accordance with the struct created by the struct creation unit 12, the serialization processing unit 15 determines the length (fixed length) of a memory area to be secured on a stack when data is written during compilation (S31).

(2) The serialization processing unit 15 secures a continuous memory area on the stack when a function is called (S32).

(3) In accordance with the struct created by the struct creation unit 12, the serialization processing unit 15 substitutes a value of the data for a variable of the area on the stack, copies the variable on the stack, and serializes the copied result on the stack area (first memory copy).

(4) The serialization processing unit 15 writes the substituted value into a buffer of the kernel together with actual data on the heap via a writev function (second memory copy). This writing is performed without intervention of the heap (S33).

(5) The serialization processing unit 15 copies the serialized data on the buffer of the kernel to a disk through periodic writing or the like using a flusher thread (S34). This completes the data serialization and writing (S35).

The advantages of the above-described (1) to (5) will be described. First, a first advantage will be described. Through the above-described (1) to (5), data to be a write target is directly written from the stack onto the kernel space via the writev function. Accordingly, as compared with the case where a general serialization format is applied, the number of memory copies is reduced, and serialization and writing can be performed at high speed with a small memory capacity, which can be listed as the first advantage.

The second advantage is that, since the size of the memory area secured in the stack is determined by a fixed length during compilation by the struct, it is possible to speed up the memory allocation.

Restrictions (1) to (5) to the above will be described. A first restriction is that common prior knowledge (a struct) is required for writing and reading in order to perform the above-described high-speed writing (if there is no prior knowledge, writing is performed in a general flow). The second restriction is that only a variable having a fixed length during compilation is supported, and a dynamic change in data structure during execution is not supported.

Figure 11:
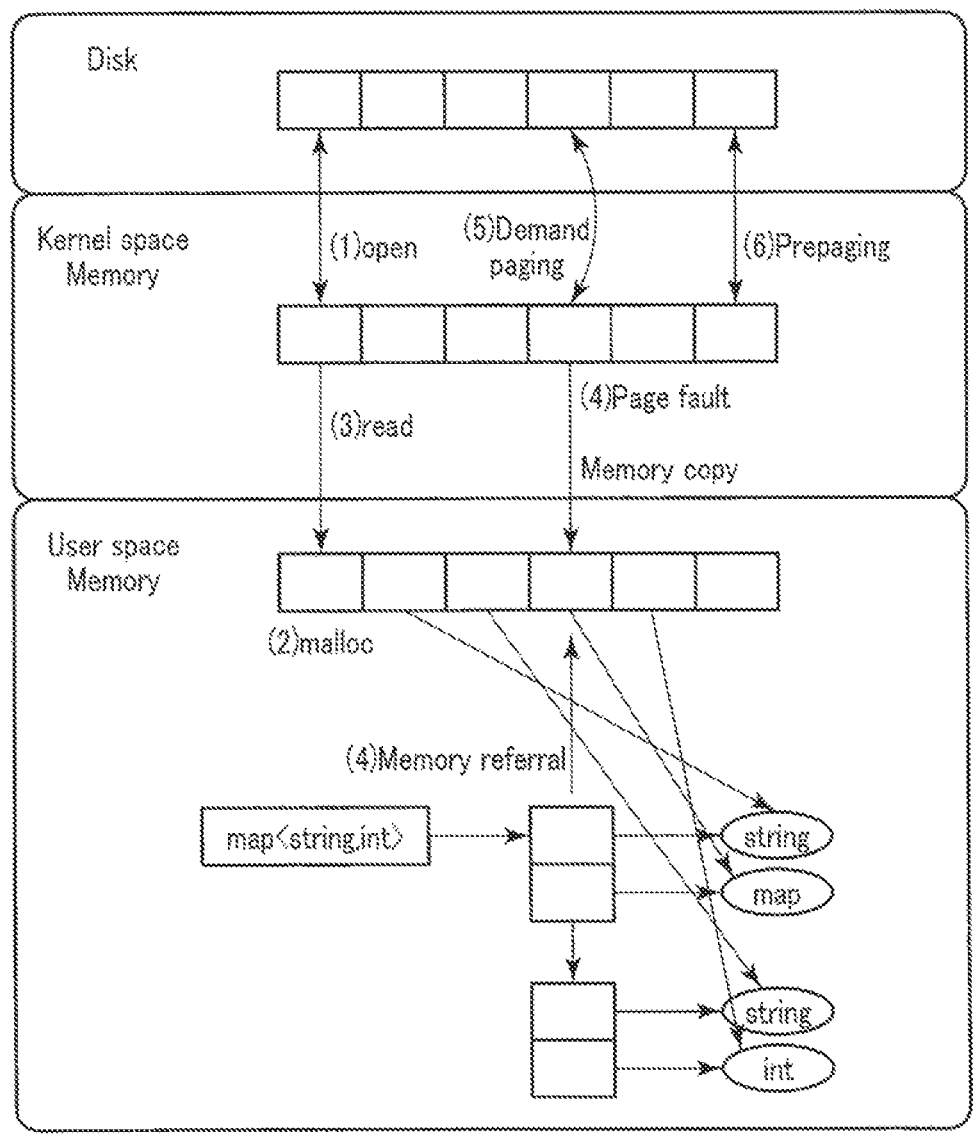
FIG. 11 is a diagram illustrating an example of a procedure of data reading and deserialization processes when a general serialization format is applied.

Next, the data reading and deserialization processes will be described. FIG. 11 is a diagram showing an example of a procedure of data reading when a general serialization format is applied. The procedure for the data reading is expressed as in the following (1) to (4).

(1) The deserialization processing unit 17 associates data on a disk with a page of a memory on the kernel space via an open function. That is, the data on the disk is copied onto a buffer of the kernel via a sync of paging.

(2) The deserialization processing unit 17 opens a file on the disk on the buffer of the kernel space via the open function, and copies the opened, serialized data onto the heap (user space) via a read function.

(3) The deserialization processing unit 17 reads the metadata of the serialized data copied onto the heap, and performs interpretation and parsing of the metadata.

(4) The deserialization processing unit 17 creates a map structure composed of Key and Value on the heap, and completes the deserialization. Map is used in an example of C++; in the case of MessagePack, defined structures such as array and map are created.

In the processing up to this point, memory allocation and memory copy between the kernel space and the user space occur.

Figure 12:
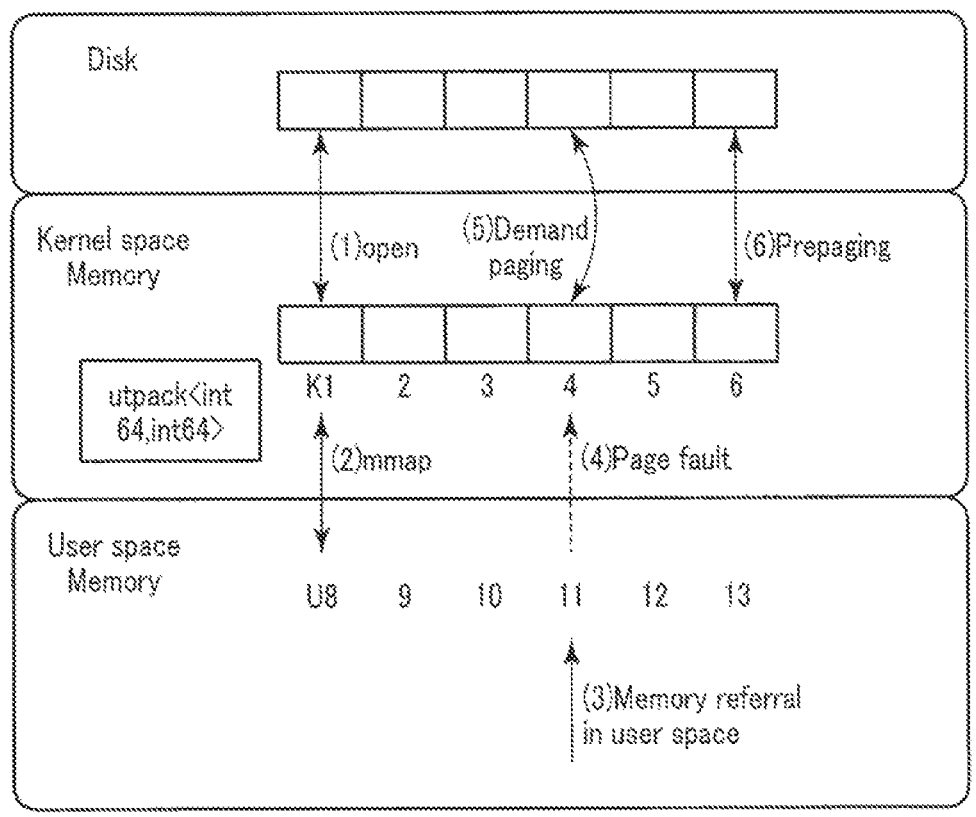
FIG. 12 is a diagram illustrating an example of a procedure of data reading and deserialization processes by the information processing apparatus according to the embodiment of the present invention.
Figure 13:
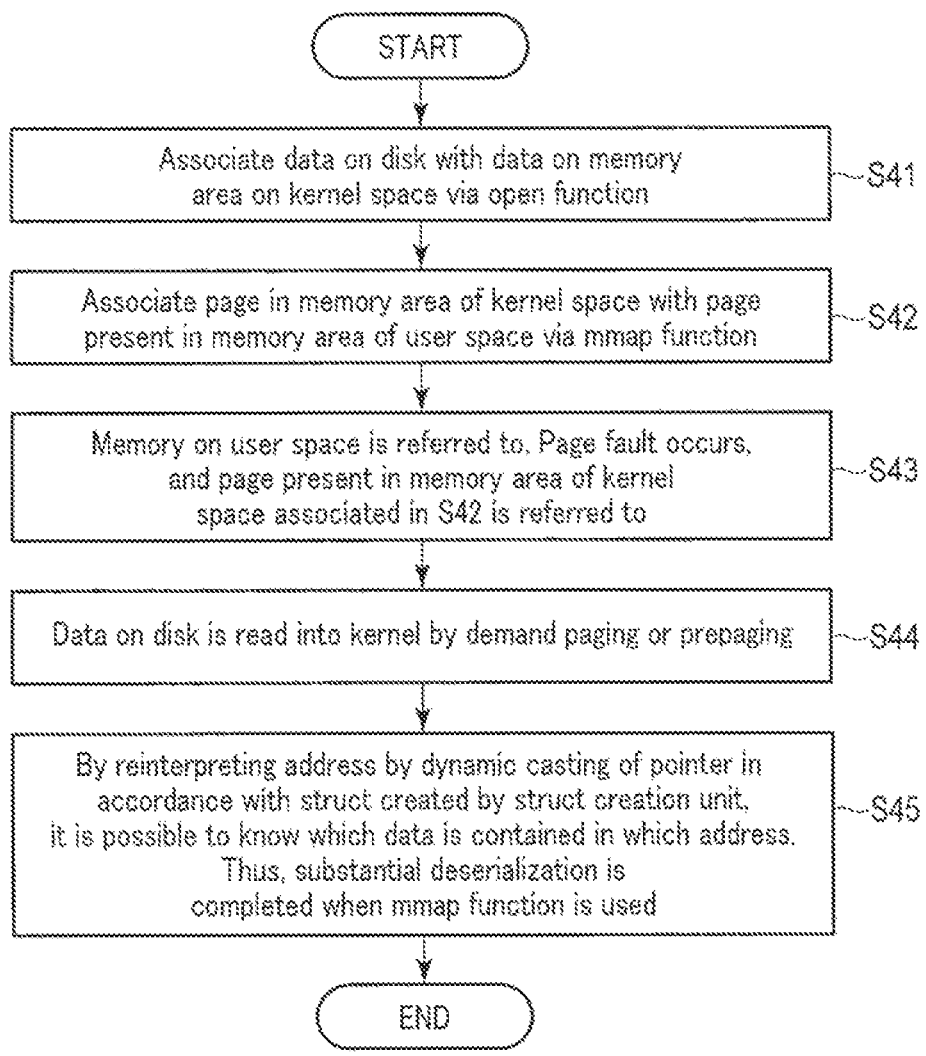
FIG. 13 is a flowchart showing an example of a procedure of data reading and deserialization processes by the information processing apparatus according to the embodiment of the present invention.

FIG. 12 is a diagram illustrating an example of a procedure of data reading and deserialization processes by the information processing apparatus according to the embodiment of the present invention. FIG. 13 is a flowchart showing an example of a procedure of data reading and deserialization processes by the information processing apparatus according to the embodiment of the present invention.

This procedure is a procedure for data reading and deserialization processes when utpack is applied, and is expressed as in the following (1) to (5).

(1) The deserialization processing unit 17 associates a memory area of data to be a read target on the disk with a memory area on the kernel space via an open function (S41).

(2) The deserialization processing unit 17 associates a page in the memory area on the kernel space with a page in the memory area on the user space using the mmap function (S42).

(3) The deserialization processing unit 17 refers to the memory on the user space. A page fault occurs, and a page in a memory area on the kernel space associated at S42 is referred to (S43). Here, memory copy is not performed between the kernel space and the user space.

(4) The deserialization processing unit 17 reads the data on disk into the kernel through demand paging or prepaging (S44).

(5) In accordance with the struct created by the struct creation unit 12, the deserialization processing unit 17 reinterprets the address by dynamic casting of the pointer, thus allowing for recognition as to which data is contained in which address. Therefore, when the mmap function is used, substantial deserialization is completed by zero copy between the kernel space and the user space (S45).

The advantages of the above-described (1) to (5) will be described. First, a first advantage will be described. Through the above-described (1) to (5), since the struct is used for deserialization, it is possible to know which region of data recorded in the memory region on the kernel space corresponds to which variable. Accordingly, reading is completed in the kernel space, which can be listed as the first advantage.

The second advantage is that, since memory copy from the kernel space to the heap in the user space and parsing of data on the heap are not required, deserialization and reading can be performed at high speed with a small memory capacity.

On the other hand, the restrictions include the necessity to have common prior knowledge (a struct and a message format) common to the serialization and deserialization processes, and when there is no prior knowledge, reading is performed by a general flow.

Next, filtering processing such as referral to the same metadata in a plurality of items of data will be described.

In data reading when the above-described general serialization format is applied, if the order of a plurality of items of metadata in a header included in a message is not determined, the data format of each item of metadata is read, and the addresses of the target metadata and the subsequent data cannot be known unless the data format of each item of metadata is read and the pointer is traced until the target metadata is reached. Therefore, it takes time to filter the plurality of items of data and to refer to different types of metadata.

On the other hand, in data reading when utpack is applied as in the embodiment of the present invention, the order of items of metadata is determined by the struct, and the relative address from the head address to each item of metadata has already been created during compilation. By thus combining each item of metadata with the head address, the filtering process can be performed at high speed.

Figure 14:
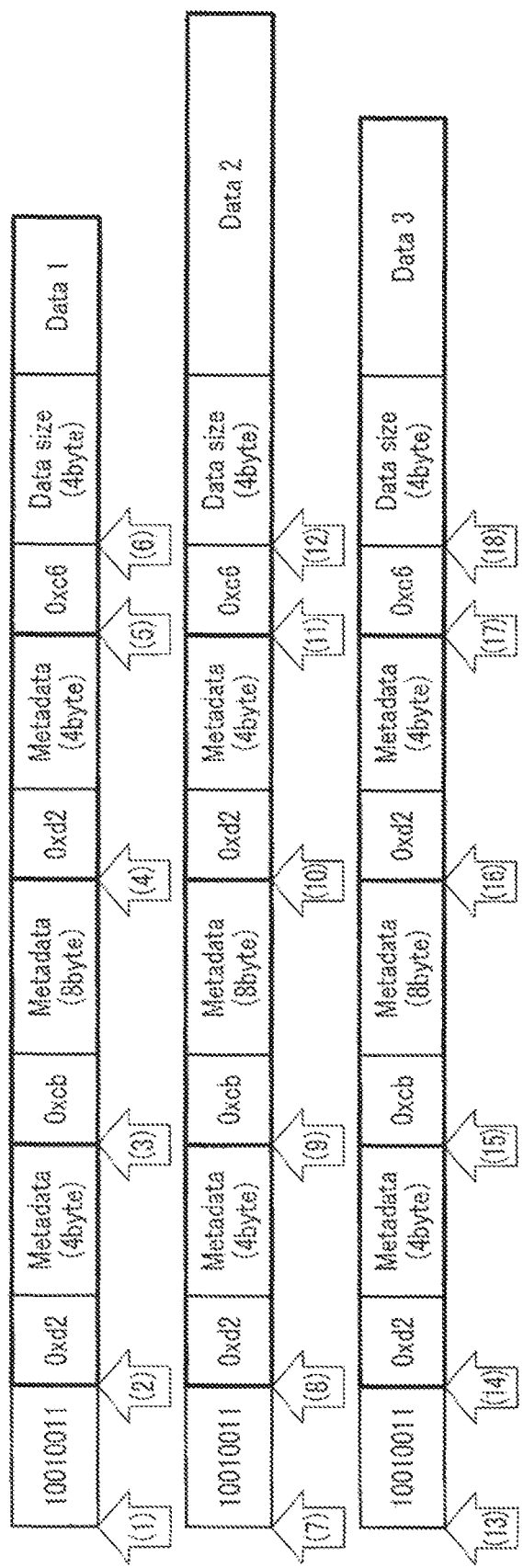
FIG. 14 is a diagram illustrating an example of a procedure of a filtering process when a general serialization format is applied.

FIG. 14 is a diagram illustrating an example of a procedure of a filtering process when a general serialization format is applied.

Here, a case will be described where a filtering process is performed on a plurality of items of sensor data using a value of one of metadata when a general serialization format is applied.

In this processing, the arrangement of data sets composed of Key and Value is variable, and after the parsing, the pointer of each data set is traced until the target metadata is referred to. Thus, the number of movements of pointers and if statements is relatively large (see "4", "10", and "16" in FIG. 14).

Figure 15:
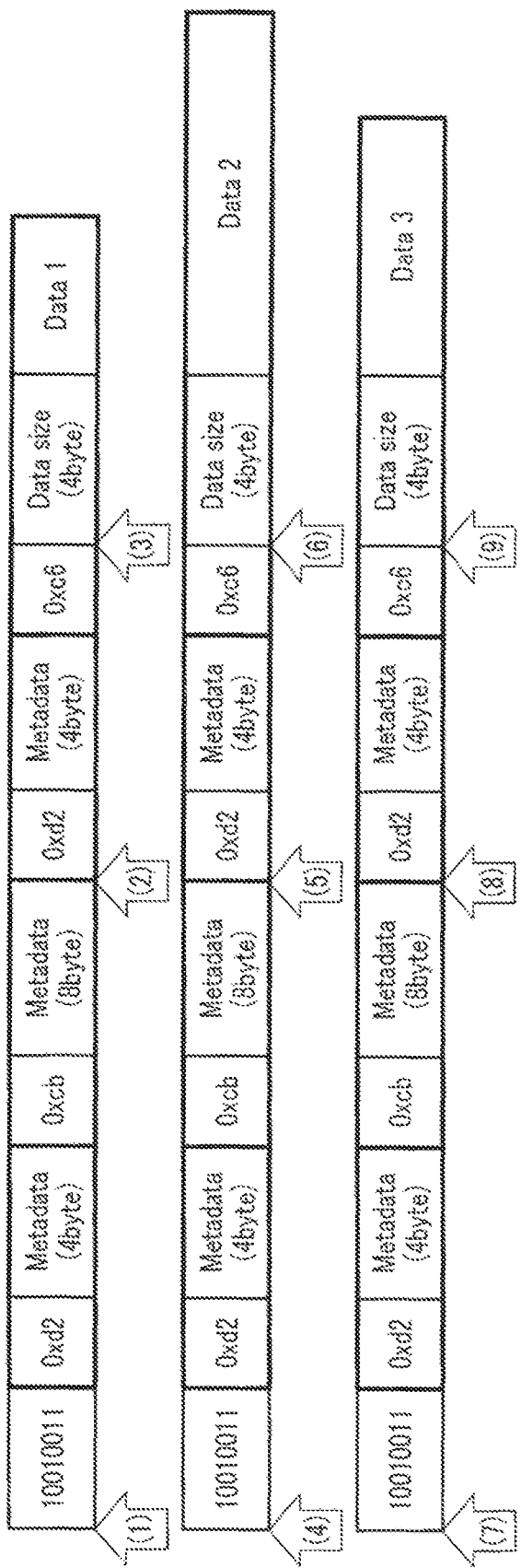
FIG. 15 is a diagram illustrating an example of a procedure of a filtering process by the information processing apparatus according to the embodiment of the present invention.

FIG. 15 is a diagram illustrating an example of a procedure of a filtering process by the information processing apparatus according to the embodiment of the present invention. This procedure is a procedure for a filtering process when utpack is applied.

Here, a case will be described where a filtering process is performed on a plurality of items of sensor data using a value of one of metadata when utpack is applied.

In this process, the position of the target metadata is known (see FIGS. 2, 5, and 8). Thus, the target data can be referred to by reducing the number of movements of the pointer.

FIG. 16 is a block diagram showing an example of a hardware configuration of the information processing apparatus according to the embodiment of the present invention.

In the example shown in FIG. 16, the information processing apparatus 10 according to the above-described embodiment is configured by, for example, a server computer or a personal computer, and includes a hardware processor 111A such as a CPU. A program memory 111B, a data memory 112, an input/output interface 113, and a communication interface 114 are connected to the hardware processor 111A via a bus 120. The same applies to the data processing unit 20.

The communication interface 114 includes, for example, one or more wireless communication interface units, and enables transmission and reception of information to and from a communication network NW. Examples of the wireless interface that may be used include an interface that adopts a low-power wireless data communication standard such as a wireless local area network (LAN).

An input device 50 and an output device 60 for an operator attached to the information processing apparatus 10 are connected to the input/output interface 113.

The input/output interface 113 performs a process of taking in operation data input by an operator through an input device 50 such as a keyboard, a touch panel, a touchpad, a mouse, etc., and outputting output data to an output device 60 including a display device that uses liquid crystals, organic electroluminescence (EL), etc. to cause the output device 60 to display the output data. As the input device 50 and the output device 60, a device built in the information processing apparatus 10 may be used; alternatively, an input device and an output device of another information terminal capable of communicating with the information processing apparatus 10 via a network NW may be used.

The program memory 111B used is, as a non-transitory, tangible storage medium, a combination of a non-volatile memory such as a read-only memory (ROM) and a non-volatile memory such as a hard disk drive (HDD) or a solid-state drive (SDD) that allows for on-demand writing and reading, and stores programs necessary for executing various control processes according to the embodiment.

The data memory 112 is a tangible storage medium in which, for example, the above-described nonvolatile memory and a volatile memory such as a random access memory (RAM) are used in combination, and is used to store various types of data acquired and created in the course of performing various processes.

The information processing apparatus 10 according to the embodiment of the present invention, which function as software-based processing function units, may be configured as a data processing apparatus including a metadata information setting unit 11, a struct creation unit 12, an actual data reception unit 13, a metadata creation unit 14, a serialization processing unit 15, a data storage unit 16, and a deserialization processing unit 17 illustrated in FIG. 1.

The data storage area and the data processing area in the data processing apparatus can be configured by using the data memory 112 shown in FIG. 16. However, these areas are not essential components in the information processing apparatus 10, and may be areas provided in an external storage medium such as a universal serial bus (USB) memory or a storage device such as a database server arranged in a cloud.

All of the processing function units in each of the metadata information setting unit 11, the struct creation unit 12, the actual data reception unit 13, the metadata creation unit 14, the serialization processing unit 15, the data storage unit 16, and the deserialization processing unit 17 can be realized by causing the hardware processor 111A to read and execute a program stored in the program memory 111B. It is to be noted that some or all of these processing function units may be implemented by various other forms including integrated circuits such as an application-specific integrated circuit (ASIC) or a field-programmable gate array (FPGA).

As described above, according to the embodiment of the present invention, it is possible to perform data serialization processing and deserialization processing at high speed with a small memory capacity, and to allow edge devices that are restricted in terms of device resources to process a large amount of IoT data at high speed.

According to a first aspect of the information processing apparatus of the present invention, the information processing apparatus comprises: a creation processing unit which creates information indicating a message structure based on which a length of a memory area to be secured in a stack area of a virtual address space assigned for a serialization process is determined during compilation; a serialization processing unit which performs a serialization process to serialize data from a device and write the serialized data into a data storage device using information created by the creation processing unit; and a deserialization processing unit which reads the serialized data and deserializes the read data using the information created by the creation processing unit.

According to a second aspect of the information processing apparatus of the present invention, the serialization processing unit allocates, in the first aspect, a continuous memory area to the stack area during compilation of information created by the creation processing unit, and substitutes the serialized data to be a write target for a variable of the allocated memory area, and writes the substituted data into a memory area of a kernel space in the virtual address space.

According to a third aspect of the information processing apparatus of the present invention, information created by the creation processing unit in the first aspect includes a pointer to data to be a read target, and the deserialization processing unit is configured to: associate a memory area of a physical address space in which data to be a read target is written with a memory area of a kernel space of the virtual address space; associate the memory area of the kernel space with a memory area of a user space of the virtual address space; read data written in the memory area of the physical address space into the associated memory area of the kernel space with reference to the memory area of the user space; and deserialize the data to be the read target by reinterpreting an address of the memory area of the kernel space and an address of the memory area of the user space by dynamic casting of a pointer included in information created by the creation processing unit.

According to a fourth aspect of the information processing apparatus of the present invention, information created by the creation processing unit in the first aspect includes information relating to actual data and a plurality of items of metadata in a predetermined order.

According to an aspect of the information processing program according to an embodiment of the present invention, a processor is caused to function as each component of the information processing apparatus according to any one of the first to fourth aspects.

According to the first aspect of the information processing apparatus according to the embodiment of the present invention, since the serialization and deserialization processes are performed on data from a device using information indicating a message structure based on which a length of a memory area to be secured in a stack area of a virtual address space assigned for a serialization process is determined during compilation, thereby the data writing and reading can be performed at high speed with a small memory capacity.

According to the second aspect of the information processing apparatus according to the embodiment of the present invention, since a continuous memory area is allocated to a stack area, and serialized data to be a write target substituted for a variable of the allocated memory area is written into a memory area of a kernel space, thereby the number of data copies can be reduced during data writing.

According to the third aspect of the information processing apparatus according to the embodiment of the present invention, a memory area of a physical address space in which data to be a read target is written is associated with a memory area of a kernel space, the memory area of the kernel space is associated with a memory area of a user space, data written in the memory area of the physical address space is read into the memory area of the kernel space; and an address of the user space and an address of the kernel space is reinterpreted using a pointer included in the created information, thereby performing a deserialization processing without performing memory copy between the user space and the kernel space.

According to the fourth aspect of the information processing apparatus according to the embodiment of the present invention, since the information created by the creation processing includes information relating to actual data and a plurality of items of metadata in a predetermined order, thereby the process of referring to the same metadata in a plurality of items of data can be performed at high speed.

The method described in each embodiment can be stored in, as a program (software means) that functions as a file in a format that can be executed by or installed on a computer, a computer-readable recording medium (or storage medium) such as a magnetic disk (e.g., a floppy (registered trademark) disk, and hard disk), an optical disk (e.g., a CD-ROM, a CD-R, a DVD-ROM, a DVD-R, and a magneto-optical disk (MO)), a semiconductor memory (a ROM, a RAM, a flash memory, etc.), or the like, or can be distributed by being transmitted through a communication medium. The program stored in the medium includes a setting program for configuring, in a computer, software means (including not only an execution program but also a table and a data structure) to be executed by the computer. A computer for realizing the present apparatus reads a program recorded on a recording medium, constructs software means using a setting program in some cases, and executes the above-described processing by controlling the operation by the software means. It is to be noted that the recording medium or storage medium referred to herein is not limited to that for distribution, and includes a storage medium or a storage medium such as a magnetic disk or a semiconductor memory provided inside a computer or in a device connected via a network. In addition, a program for realizing the above-described processing may be stored on a computer (server) connected to a network such as the Internet and downloaded to a computer (client) via the network.

It is to be noted that the present invention is not limited to the above-described embodiment, and may be embodied in various manners without departing from the gist of the present invention at the implementation stage. In addition, each embodiment may be appropriately combined and realized, and in this case, combined effects are obtained. Furthermore, various inventions are included in the above-described embodiments, and various inventions can be extracted by a combination selected from a plurality of constituent elements disclosed herein. For example, even if some constituent elements are deleted from all the constituent elements shown in the embodiment, if the problem can be solved and the effect can be obtained, the configuration from which the constituent elements are deleted can be extracted as the invention.

REFERENCE SIGNS LIST

10: Information processing apparatus
11: Metadata information setting unit
12: Struct creation unit
13: Actual data reception unit
14: Metadata creation unit
15: Serialization processing unit
16: Data storage unit
17: Deserialization processing unit
20: Data processing unit 31: Apparatus
32: Sensor
33: Device

The invention claimed is:

1. An information processing apparatus comprising:
a creation processing unit which creates information indicating a message structure based on which a length of a memory area to be secured in a stack area of a virtual address space assigned for a serialization process is determined during compilation;
a serialization processing unit which performs the serialization process to serialize data from a device and write the serialized data into a data storage device using the information created by the creation processing unit; and
a deserialization processing unit which reads the serialized data written into the data storage device and deserializes the read data using the information created by the creation processing unit.

2. The information processing apparatus according to claim 1, wherein the serialization processing unit is configured to:
allocate a continuous memory area to the stack area during compilation of the information created by the creation processing unit; and
substitute the serialized data to be a write target for a variable of the allocated memory area, and write the substituted data into a memory area of a kernel space in the virtual address space.

3. The information processing apparatus according to claim 1, wherein
the information created by the creation processing unit includes a pointer to data to be a read target, and
the deserialization processing unit is configured to:
associate a memory area of a physical address space in which the data to be the read target is written with a memory area of a kernel space in the virtual address space;
associate the memory area of the kernel space with a memory area of a user space of the virtual address space;
refer to the memory area of the user space;
read data written in the memory area of the physical address space into the associated memory area of the kernel space; and
deserialize the data to be the read target by reinterpreting an address of the memory area of the kernel space and an address of the memory area of the user space by dynamic casting of a pointer included in information created by the creation processing unit.

4. The information processing apparatus according to claim 1, wherein the information created by the creation processing unit includes information relating to actual data and a plurality of items of metadata in a predetermined order.

5. An information processing method performed by an information processing apparatus comprising a data storage apparatus, comprising:
creating information indicating a message structure based on which a length of a memory area to be secured in a stack area of a virtual address space assigned for a serialization process is determined during compilation;
serializing data from a device and writing the serialized data into the data storage device using the created information; and
reading the serialized data written into the data storage device and deserializing the read data using the created information.

6. A non transitory computer readable storage medium storing an information processing program for causing a processor to function as each component of the information processing apparatus according to claim 1.

* * * * *